United States Patent
Gurspan

(10) Patent No.: US 10,628,394 B1
(45) Date of Patent: Apr. 21, 2020

(54) DATABASE ANALYSIS SERVICE

(71) Applicant: Amazon Technologies, Inc., Seattle, WA (US)

(72) Inventor: Mitchell Gurspan, Boynton Beach, FL (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 15/444,144

(22) Filed: Feb. 27, 2017

(51) Int. Cl.
*G06F 16/00* (2019.01)
*G06F 16/21* (2019.01)
*G06F 11/36* (2006.01)

(52) U.S. Cl.
CPC ............ *G06F 16/21* (2019.01); *G06F 11/368* (2013.01); *G06F 11/3616* (2013.01)

(58) Field of Classification Search
CPC ........... G06F 17/30289; G06F 11/3616; G06F 11/368
USPC ....................................................... 707/609
See application file for complete search history.

(56) References Cited

U.S. PATENT DOCUMENTS

| | | | | |
|---|---|---|---|---|
| 8,255,529 | B2* | 8/2012 | Ferris | G06F 9/5072 709/223 |
| 8,606,897 | B2* | 12/2013 | Ferris | G06Q 10/00 705/80 |
| 8,769,059 | B1* | 7/2014 | Chheda | H04L 41/0866 709/220 |
| 8,954,574 | B1* | 2/2015 | Chheda | G06Q 20/085 709/220 |
| 9,268,670 | B1* | 2/2016 | Lachwani | G06F 11/3684 |
| 2007/0011317 | A1* | 1/2007 | Brandyburg | H04L 43/026 709/224 |
| 2009/0282222 | A1* | 11/2009 | Hoover | G06F 15/17356 712/220 |
| 2011/0208875 | A1* | 8/2011 | Hasson | G06F 1/3203 709/238 |
| 2011/0213875 | A1* | 9/2011 | Ferris | G06F 9/5072 709/224 |
| 2012/0131173 | A1* | 5/2012 | Ferris | G06F 9/5066 709/224 |

* cited by examiner

*Primary Examiner* — Vincent F Boccio
(74) *Attorney, Agent, or Firm* — Davis Wright Tremaine LLP

(57) ABSTRACT

A database analysis service implements techniques for determining recommended database instance types for migration. A first set of metrics is generated for a database system and one or more database instances is instantiated so that a corresponding second set of metrics can be generated for each of the database instances. Suitable instance types are identified by comparing the corresponding second set of metrics to the first set of metrics to determine whether the instance increases database performance.

20 Claims, 10 Drawing Sheets

DATABASE ANALYSIS SERVICE

BACKGROUND

Computer users seeking to reduce the expense and overhead associated with maintaining their own computing resources have turned to purchasing computing services offered by computing resource service providers. Such computing services are often configurable and scalable to meet various computing needs of the computer users and to provide high availability. The use of hosted computing service and storage has proliferated in recent years where the resources for network computing and storage are often provided by computing resource providers that leverage large-scale networks of computer systems to host and execute a variety of applications and services. Customers with existing database systems who wish to migrate their existing database systems to database systems that are hosted by the computing resource service provider to take advantage of increased availability and scalability may find that determining which type of hosted database system will meet their needs can be challenging.

BRIEF DESCRIPTION OF THE DRAWINGS

Various techniques will be described with reference to the drawings, in which.

DETAILED DESCRIPTION

Figure 1:
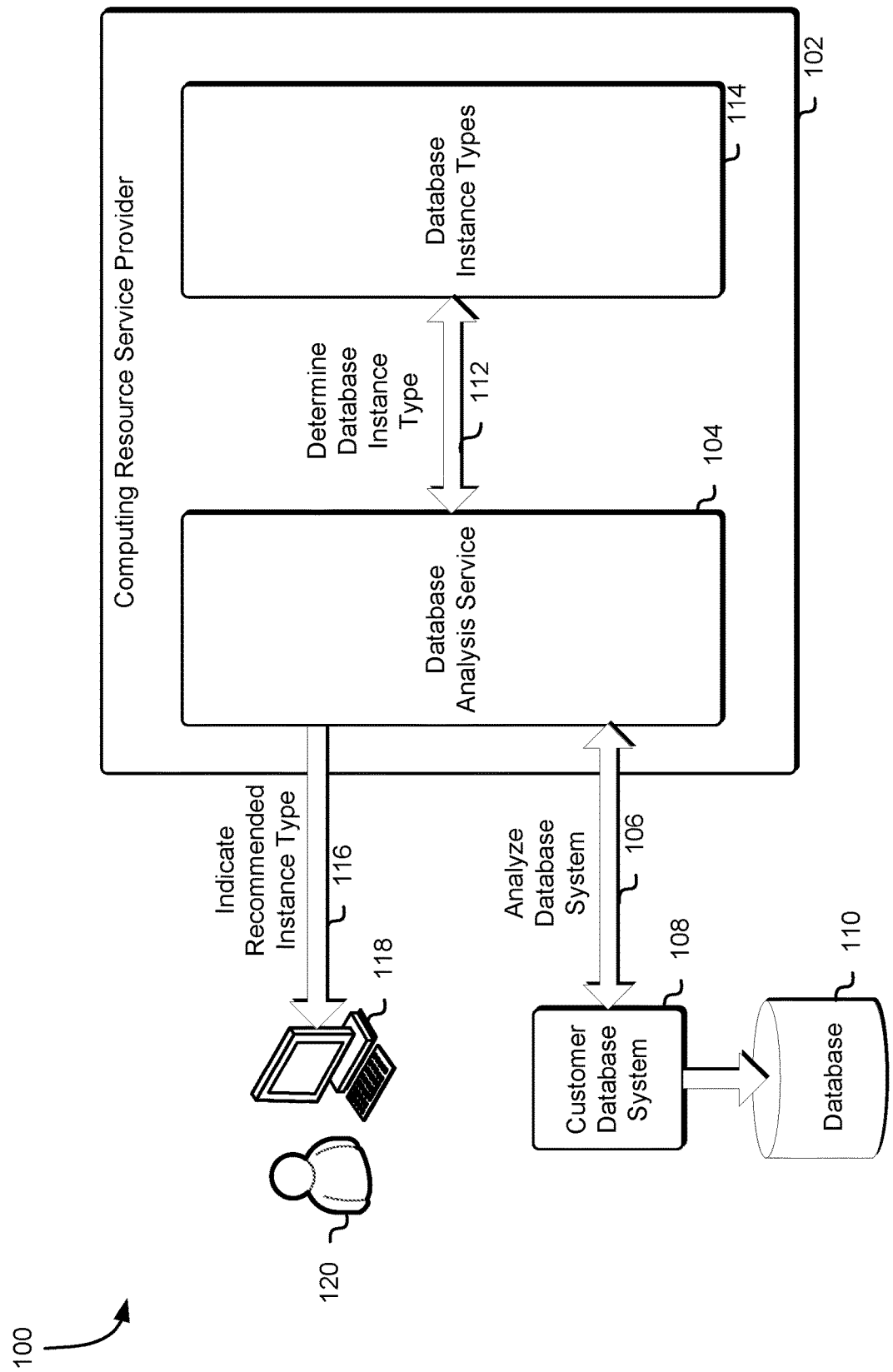
FIG. 1 illustrates an example environment where a database system is analyzed and recommendations for a database instance type are provided using a database analysis service.

A computing resource service provider provides customers with access to various computing resources to execute and/or operate various applications on behalf of the customer. In one embodiment, customers of a computing resource service provider are provided with access to a database service and the database service provides customers with access to various databases. In one embodiment, these databases include single instance databases or databases that are distributed between computing resources, data centers, regions, or zones (e.g., fault zones or availability zones) of the computing resource service provider. A distributed database is maintained across multiple different regions (e.g., one or more copies of the database maintained by computing resources in each region) to provide availability and reduced latency when accessing the database in the various regions. In one embodiment, these databases are structured query language ("SQL") databases. In one embodiment, these databases are non-structured ("noSQL") databases.

Customers of a computing resource service provider frequently have existing database systems operating on computing resources owned and/or operated by the customer and, when deciding to migrate to database systems hosted by the computing resource service provider, want to migrate to a comparable database system, with the same or better data throughput, query speed, concurrency, CPU usage, memory usage, network bandwidth, and/or performance for other database performance metrics. In order to provide a mechanism for determining what type of database instance type is appropriately configured to provide the same or better data throughput, query speed, concurrency, CPU usage, memory usage, network bandwidth, and/or performance for other database performance metrics, a database analysis service analyzes the database system of the customer and then uses that analysis to indicate one or more database instance types that will provide the same or better data throughput, query speed, concurrency, CPU usage, memory usage, network bandwidth, and/or performance for other database performance metrics.

In one embodiment, to determine the one or more database instance types that will provide the same or better data throughput, query speed, concurrency, CPU usage, memory usage, network bandwidth, and/or performance for other database performance metrics, the database analysis service analyzes the database system of the customer to determine an initial configuration based on: a central processing unit ("CPU") speed, a CPU type, number of CPUs, amount of memory, type of memory, network bandwidth, peak load, peak load times, and/or other such factors. In one embodiment, the database analysis service then uses this analysis of the database system to select an initial configuration (i.e., an initial instance type) from one or more instance types provided by the computing resource service provider. In one embodiment, the database analysis service also analyzes the type of database and/or the type of database queries when analyzing the database system of the customer. It should be noted that, as used in the present disclosure, a "customer" refers to a customer of the computing resource service provider, a customer of the database analysis service, and/or a customer of other services of the computing resource service provider.

In one embodiment, the database analysis service uses the analysis of the database system of the customer to select a set of performance tests to perform on the database system of the customer. In one embodiment, these performance tests are selected from database benchmark tests such as HammerDB, SQL Server Distributed Replay, Benchmark Factory, Open Source Database Benchmark, Database Benchmark, and the other such benchmark tests. In one embodiment, these performance tests are selected from custom database benchmarks provided by the customer. In one embodiment, these performance tests are selected from benchmark tests provided by the computing resource service provider. As with the use of the analysis of the database system to select an initial configuration, the database analysis service, in one embodiment, uses the analysis of the type of database and/or the type of database queries to determine the performance tests to perform on the database system of the customer. In one embodiment, the database analysis service selects a combination of benchmark tests to perform on the database system of the customer, performs the benchmark tests using login credentials provided by the customer, and records the results of these database benchmark tests for later comparison, as described below.

In one embodiment, the database analysis service uses the results of the benchmark tests to determine which database instance types provides the same or better data throughput, query speed, concurrency, CPU usage, memory usage, network bandwidth, and/or performance for other database performance metrics. In one embodiment, the database analysis service begins instantiating database instances from the possible database instance types and then performs the same benchmark tests as those that were performed on the database system of the customer. The database analysis service compares the results from the benchmark tests of the instantiated database instance to the results of the benchmark tests of the database system of the customer to determine if the instantiated database instance provides the same or better data throughput, query speed, concurrency, CPU usage, memory usage, network bandwidth, and/or performance for other database performance metrics. In one embodiment, a database instance that provides the same or better data throughput, query speed, concurrency, CPU usage, memory usage, network bandwidth, and/or performance for other database performance metrics is recommended for migration (i.e., the instance type may be indicated as a good candidate for the customer to migrate to). In one embodiment, a database instance that does not provide the same or better data throughput, query speed, concurrency, CPU usage, memory usage, network bandwidth, and/or performance for other database performance metrics is not be recommended for migration.

In one embodiment, the database analysis service instantiates a first database instance from a first database type and, in the event that the database instance does not provide the same or better data throughput, query speed, concurrency, CPU usage, memory usage, network bandwidth, and/or performance for other database performance metrics as the database system of the customer, the database analysis service selects the next larger database instance type (i.e., a database instance with greater resources to provide better throughput, query speed, concurrency, CPU usage, memory usage, network bandwidth, and/or performance for other database performance metrics) and runs the same benchmark tests. In one embodiment, the database analysis service iteratively runs the benchmark tests on increasingly larger database instances until a database instance type that provides the same or better data throughput, query speed, concurrency, CPU usage, memory usage, network bandwidth, and/or performance for other database performance metrics as compared to the database system of the customer is identified as a candidate database instance type for migration. In one embodiment, the first database instance is identified based at least in part on the analysis of the database system of the customer, as described above.

In one embodiment, the database analysis service instantiates a plurality of database instances from a plurality of database instance types and runs the benchmark tests on all of the database instances in parallel (e.g., runs the benchmark tests on all of the instances at the same time). Those database instances that provide the same or better data throughput, query speed, concurrency, CPU usage, memory usage, network bandwidth, and/or performance for other database performance metrics as compared to the database system of the customer are identified as candidate database instance types for migration.

In one embodiment, when the database analysis service has identified one or more candidate database instance types for migration, the database analysis service indicates these one or more candidate database instance types to the customer. In one embodiment, the database analysis service automatically instantiates one or more of the candidate database instance types and begins migration of the data from the database system of the customer to the new instances.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where a database system is analyzed and recommendations for a database instance type are provided using a database analysis service in accordance with an embodiment. In the example environment 100 illustrated in FIG. 1, a database analysis service 104 of a computing resource service provider 102 analyzes 106 a customer database system 108. In one embodiment, the customer database system 108 includes one or more databases 110 that are used to provide data storage services to a customer of the computing resource service provider 102. In one embodiment, the database analysis service 104 uses the analysis of the customer database system 108 to determine 112 one or more database instance types that provide the same or better data throughput, query speed, concurrency, CPU usage, memory usage, network bandwidth, and/or performance for other database performance metrics as compared to the customer database system 108. In one embodiment, the one or more database instance types are selected from a repository of database instance types 114 as described below. In one embodiment, the database analysis service 104 indicates 116 the recommended instance types to the customer 120 of the computing resource service provider 102 using a client computing device 118 associated with the customer 120 of the computing resource service provider 102.

In one embodiment, the repository of database instance types 114 includes a set of database instance types with one base database instance type and one or more database instance types that are incremental improvements of one or more other database instance types in the set. In one embodiment, a base database instance type is the smallest (e.g., the least expensive) database instance type with a single CPU and two GB of memory. In one embodiment, an incremental improvement on this database instance type, which is a different database instance type of the one or more database instance types in the repository of database instance types 114, may have two CPUs and two GB of memory (e.g., may have more CPUs and the same amount of memory). In one embodiment, an incremental improvement on this database instance type, which is a different database instance type of the one or more database instance types in the repository of database instance types 114, may have one CPU and four GB of memory (e.g., may have the same number of CPUs and more memory). In one embodiment, an incremental improvement on this database instance type, which is a different database instance type of the one or more database instance types in the repository of database instance types 114, may have two CPUs and four GB of memory (e.g., may have more CPUs and more memory).

In one embodiment, the customer 120 of the computing resource service provider 102 begins the process of determining which database instance type to migrate to by issuing a command to begin a migration of the customer database system 108. In one embodiment, the customer 120 of the computing resource service provider 102 begins the process of determining which database instance type to migrate to by issuing a command to determine recommended instance types for the migration of the customer database system 108. In one embodiment, the command to begin a migration is generated by the customer 120 of the computing resource service provider 102 who uses the client computing device 118 to connect to a variety of services provided by a computing resource service provider 102. In one embodiment, the customer 120 of the computing resource service provider 102 uses the client computing device 118 to connect to the computing resource service provider 102 over a network such as those networks described herein. A computing resource service provider 102 provides a distributed, virtualized, and/or datacenter environment within which one or more applications, processes, services, virtual machines, and/or other such computer system entities may be executed. In one embodiment, the customer 120 is a process running on one or more remote computer systems controlled by a user of the computing resource service provider.

In one embodiment, commands from the customer 120 to the computing resource service provider 102 originate from an outside computer system. In one embodiment, commands from the customer 120 to the computing resource service provider 102 originate from within the computing resource service provider environment. In one embodiment, the commands to connect to the computing resource service provider 102 are sent to the computing resource service provider 102 and/or to other services operating in the environment therein, without the direct intervention of the customer 120 (i.e., commands to connect to the computing resource service provider 102 are generated automatically in response to one or more events). In one embodiment, the customer 120 connects to the computing resource service provider 102 using a privileged user account associated with the customer 120 of the computing resource service provider 102. In one embodiment, the customer uses a privileged user account associated with and/or provided by the computing resource service provider 102.

In one embodiment, the computing resource service provider 102 provides access to one or more host machines. In one embodiment, the computing resource service provider 102 provides access to one or more virtual machine instances operating thereon. In one embodiment, the computing resource service provider 102 provides access to one or more services in an environment therein. In one embodiment, the one or more services provided by the computing resource service provider 102 are implemented as and/or utilize one or more virtual machine instances that are operating on host machines operating within the computing resource service provider 102 environment. In one embodiment, the computing resource service provider 102 provides a variety of services to users and/or customers of the computing resource service provider 102. In one embodiment, the users and/or customers of the computing resource service provider 102 communicate with the computing resource service provider 102 via an interface such as a web services interface or using some other type of interface. In one embodiment, each of the services operating in an environment of the computing resource service provider 102 has its own interface and, generally, subsets of the services can have corresponding interfaces in addition to or as an alternative to the single interface.

In one embodiment, the user interacts with services of the computing resource service provider (via appropriately configured and authenticated API requests) to provision and operate services that are instantiated on physical computing devices hosted and operated by the computing resource service provider 102. These services are configured to manage resources (e.g., storage, processors, memory, network, etc.) associated with the services. These resources are used for various purposes, such as to operate as servers supporting a website, to operate business applications or, generally, to serve as computing power for the customer. Other applications of the services can support database applications, electronic commerce applications, business applications, and/or other such applications.

In the example environment 100 illustrated in FIG. 1, the database analysis service 104 is a service provided by the computing resource service provider 102 to manage the migration of customer database systems such as the customer database system 108. In one embodiment, the database analysis service 104 is a collection of computing resources that operate collectively to process requests to migrate database systems such as the customer database system 108. These computing resources are configured to process requests to migrate database systems such as the customer database system 108 and include at least one of: computer systems (the computer systems including processors and memory), networks, storage devices, executable code, services, processes, modules, or applications. In one embodiment, the computing resources configured to process requests to migrate database systems such as the customer database system 108 include virtual systems that are implemented on shared hardware hosted by a computing resource service provider such as the computing resource service provider 102. In one embodiment, the database analysis service 104 is implemented as a single system. In one embodiment, the database analysis service 104 is implemented as a distributed system, with a plurality of instances operating collectively to process requests to migrate database systems such as the customer database system 108. In one embodiment, the database analysis service 104 operates using computing resources (e.g., databases and/or virtual machine instances) that enable the database analysis service 104 to process requests to migrate database systems such as the customer database system 108.

In one embodiment, the database analysis service 104 maintains data and/or metadata such that, when a request to process requests to migrate database systems such as the customer database system 108 is received, the data and/or metadata can be located, processed, and provided (or a streaming data object can be initiated) for use in processing the request. In one embodiment, the data and/or metadata maintained by the database analysis service 104 is organized as data objects. In one embodiment, these data objects have arbitrary sizes. In one embodiment, these data objects have constraints on size or durability. Thus, the database analysis service 104 is configured to manage numerous data objects of varying sizes. In one embodiment, the database analysis service 104 stores the data objects in storage resources controlled by the database analysis service 104. In one embodiment, the database analysis service 104 stores the data objects using resources controlled by some other service such as a data storage service. In one embodiment, the database analysis service 104 stores the data objects using a combination of storage locations. In one embodiment, the database analysis service 104 operates as a key value store that associates the data objects with identifiers of the data objects that are used to retrieve or perform other operations in connection with the data objects. In one embodiment, the database analysis service 104 generates metadata associated with the data objects and causes such metadata to process requests to migrate database systems such as the customer database system 108.

In the example environment 100 illustrated in FIG. 1, the repository of database instance types 114 contains a plurality of database instance types that may be used to instantiate database instances that provide database services for customers of the computing resource service provider 102. In one embodiment, the repository of database instance types 114 includes specifications for one or more database instance types that specify hardware (or virtual hardware), software, network connections, and access to database services for a database instance. In one embodiment, a database instance type specifies two CPUs, eight gigabytes ("GB") of memory, one or more applications to run on the instance, data storage for the instance, one or more network connections to the instance, and the location of one or more database services of the computing resource service provider 102 that can be used to provide database access to the applications of the instance. In one embodiment, the CPUs, the memory, the storage, and/or the network connections are virtual resources provided by the computing resource service provider 102 as described herein.

It should be noted that while the techniques and embodiments described herein refer to migration of database systems to the computing resource service provider environment, other systems may be migrated to computing resource service provider environment using the techniques described herein. In one embodiment, data stored by a customer in customer-operated on-demand storage system has certain input and output metrics that can be determined by storing and retrieving a set amount of data using the customer-operated on-demand storage system. In one embodiment, these metrics are used to identify an on-demand storage system of the computing resource service provider that has the same or better input and output metrics and a recommendation to migrate to this identified on-demand storage system of the computing resource service provider is provided to the customer.

Figure 2:
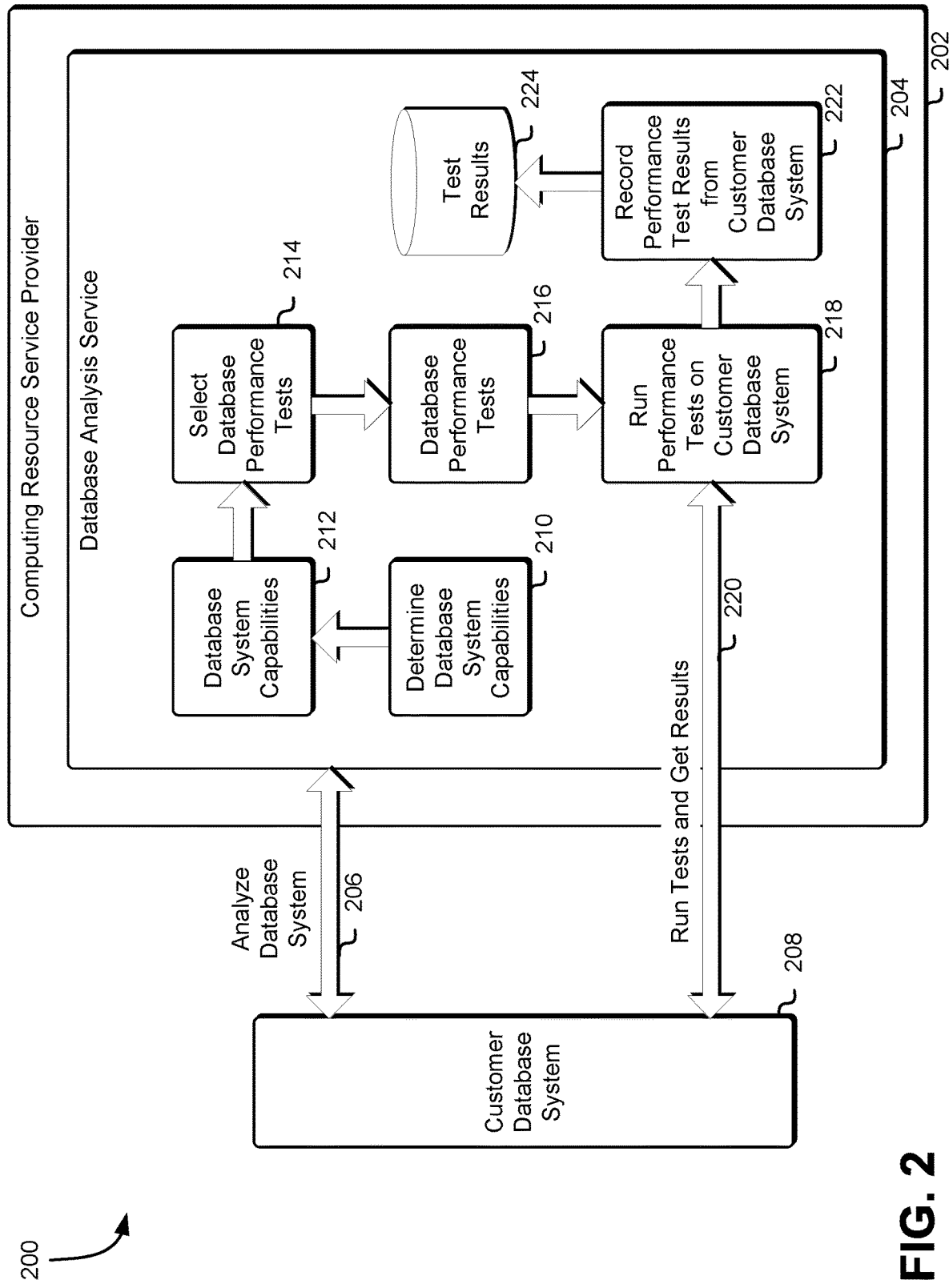
FIG. 2 illustrates an example environment where a database system is analyzed using a database analysis service.

FIG. 2 illustrates an example environment 200 where a database system is analyzed using a database analysis service as described in connection with FIG. 1 and in accordance with an embodiment. In the example environment 200 illustrated in FIG. 2, the database analysis service 204 of the computing resource service provider 202 analyzes 206 the customer database system 208 by first determining 210 the system capabilities of the customer database system 208 and saving these database system capabilities 212 for later use. As described above, in one embodiment, the database system capabilities 212 of the customer database system 208 include hardware capabilities (e.g., CPU number and type, memory, or network bandwidth) and/or database performance capabilities (e.g., query speed or data throughput).

In the example environment 200 illustrated in FIG. 2, the database system capabilities 212 are used to select the database performance tests 214 (i.e., the database performance tests 216 are selected based at least in part on the database system capabilities). In one embodiment, the database performance tests 216 are selected from a standard set of database performance tests. In one embodiment, the database performance tests 216 are custom database performance tests provided by the customer that are specific to the customer database system 208.

In one embodiment, the database analysis service 204 continues the analysis of the database system by using the selected database performance tests 216 to run the database performance tests 218 on the customer database system 208. In one embodiment, the database analysis service 204 uses login credentials (e.g., authorization and/or authentication credentials) provided by the customer associated with the customer database system 208 to run the database performance tests 218 on the customer database system 208. In one embodiment, the customer associated with the customer database system 208 provides access to the customer database system 208 using login credentials such as a user name and a password. The database analysis service 204 then uses these login credentials to run the database performance tests 218 on the customer database system 208.

In one embodiment, the database analysis service 204 runs the database performance tests 218 on the customer database system 208, receives the results 220 of the database performance tests, and records the performance test results from the customer database system 222 in a test results repository 224, which is used by the database analysis service 204 to provide recommendations for a database instance type for migration as described below.

Figure 3:
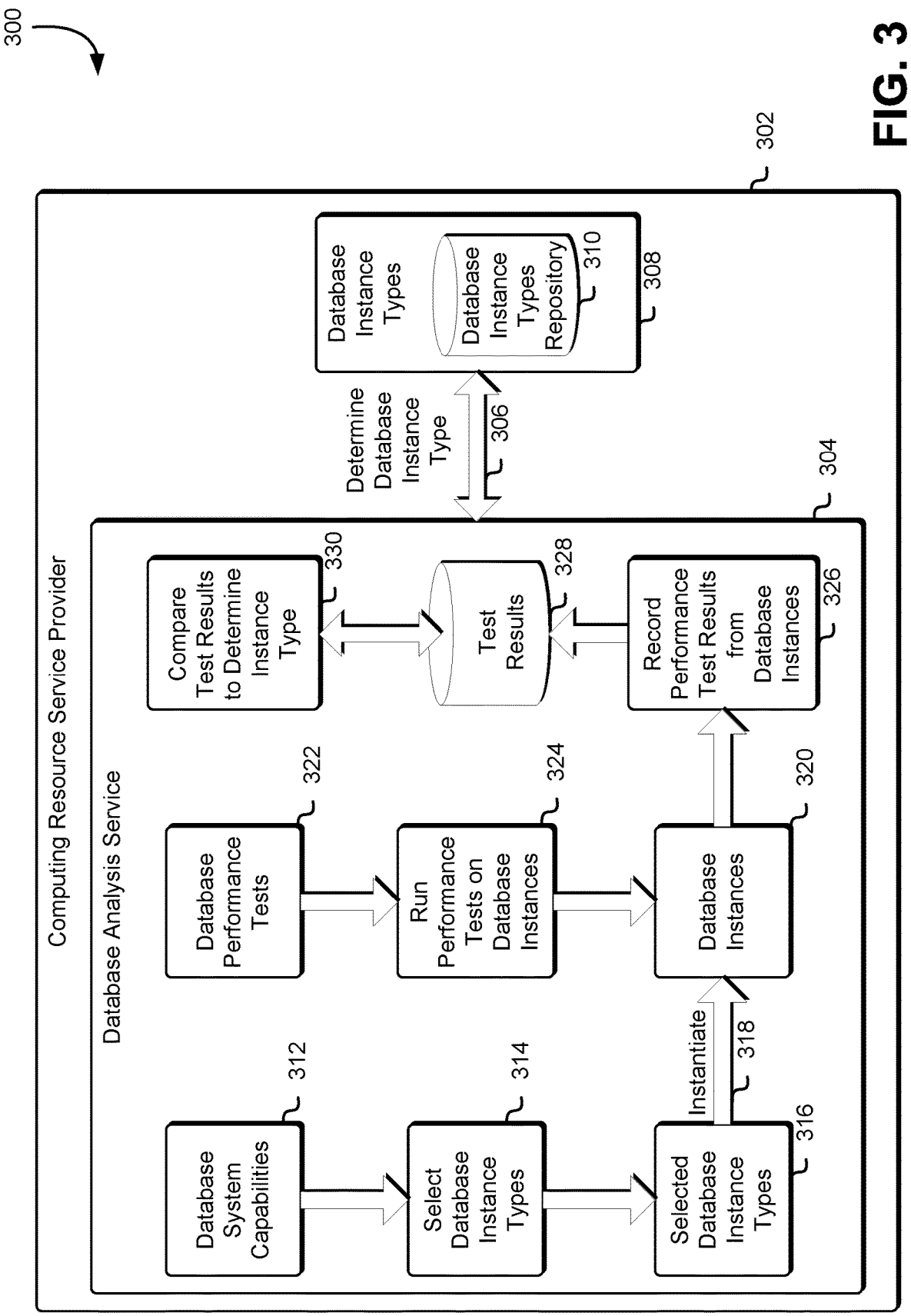
FIG. 3 illustrates an example environment where recommendations for a database instance type are provided using a database analysis service.

FIG. 3 illustrates an example environment 300 where recommendations for a database instance type are provided using a database analysis service as described in connection with FIG. 1 and in accordance with an embodiment. In the example environment 300 illustrated in FIG. 3, the database analysis service 304 of the computing resource service provider 302 determines the database instance type 306 from one or more database instance types 308, which in one embodiment, are stored in a database instance types repository 310 as described above.

In one embodiment, the database analysis service 304 first uses the database system capabilities 312 (i.e., the system capabilities of the customer database system, as described above) to select one or more database instance types 314. In one embodiment, the database analysis service 304 uses the database system capabilities 312 to select one or more database instance types 314 based at least in part on system capabilities of the customer database system including, but not limited to, the number and type of CPUs of the customer database system, the amount of memory of the customer database system, or the network bandwidth of the customer database system. In one embodiment, the database analysis service 304 uses database system capabilities 312 to select one or more database instance types 314 based at least in part on system capabilities of the customer database system including, but not limited to, the database data throughput of the customer database system (e.g., the amount of queries that can be executed per second), the database query speed of the customer database system (e.g., the delay or latency between the query and the response), the database concurrency of the customer database system (e.g., the number of simultaneous users and/or simultaneous queries that the database system can support), the central processing unit usage of the customer database system (e.g., the highest CPU load of the customer database system), the memory usage of the customer database system (e.g., the highest memory usage of the customer database system), the network bandwidth of the customer database system (e.g., the amount of network resources used by the customer database system), the peak load of the customer database system (e.g., the changes in demand for the customer database system during a particular time period such as an hour, a day, a week, etc. as compared to the average demand), the peak load times of the customer database system (e.g., the times and/or durations of the high demand periods), or the input-output speed of the customer database system (e.g., the amount of input and output capacity per unit time used by the customer database system).

In one embodiment, the database analysis service 304 selects the one or more database instance types 314 based at least in part on previously selected database instance types. In one embodiment, the database analysis service 304 selects the one or more database instance types 314 based at least in part on previous requests to perform data migrations using a machine learning algorithm that maps a particular type of database migration request to a particular database instance type such as a decision tree algorithm, a probabilistic classifier algorithm, a least-squares regression algorithm, a support vector machine, or various unsupervised learning algorithms. In one embodiment, the machine learning algorithm can be used to provide additional input to the database analysis service 304 when selecting the one or more database instance types 314 using past results of successful migration recommendations.

In one embodiment, the selected database instance types 316 are used by the database analysis service 304 to instantiate 318 one or more database instances 320. In one embodiment, one or more database instances 320 are instantiated for each of the selected database instance types. In one embodiment, exactly one database instance is instantiated for each of the selected database instance types.

In one embodiment, the database analysis service 304 uses the database performance tests 322 to run performance tests on the database instances 324 and record the performance test results from the database instances 326. In one embodiment the database performance tests 322 are the same database performance tests as the database performance tests 216 described in connection with FIG. 2. In one embodiment, the database analysis service 304 records the performance test results from the database instances 326 in a test results repository 328. In one embodiment, the test results repository 328 is the same as the test results repository 224 described in connection with FIG. 2. In one embodiment, the test results repository 328 is different not the same as the test results repository 224 described in connection with FIG. 2. In one embodiment, the database analysis service 304 compares the test results to determine recommended instance types 330 (i.e., the database analysis service 304 compares the database performance test results from the database instance types to the database performance test results from the customer database system), as described below.

Figure 4:
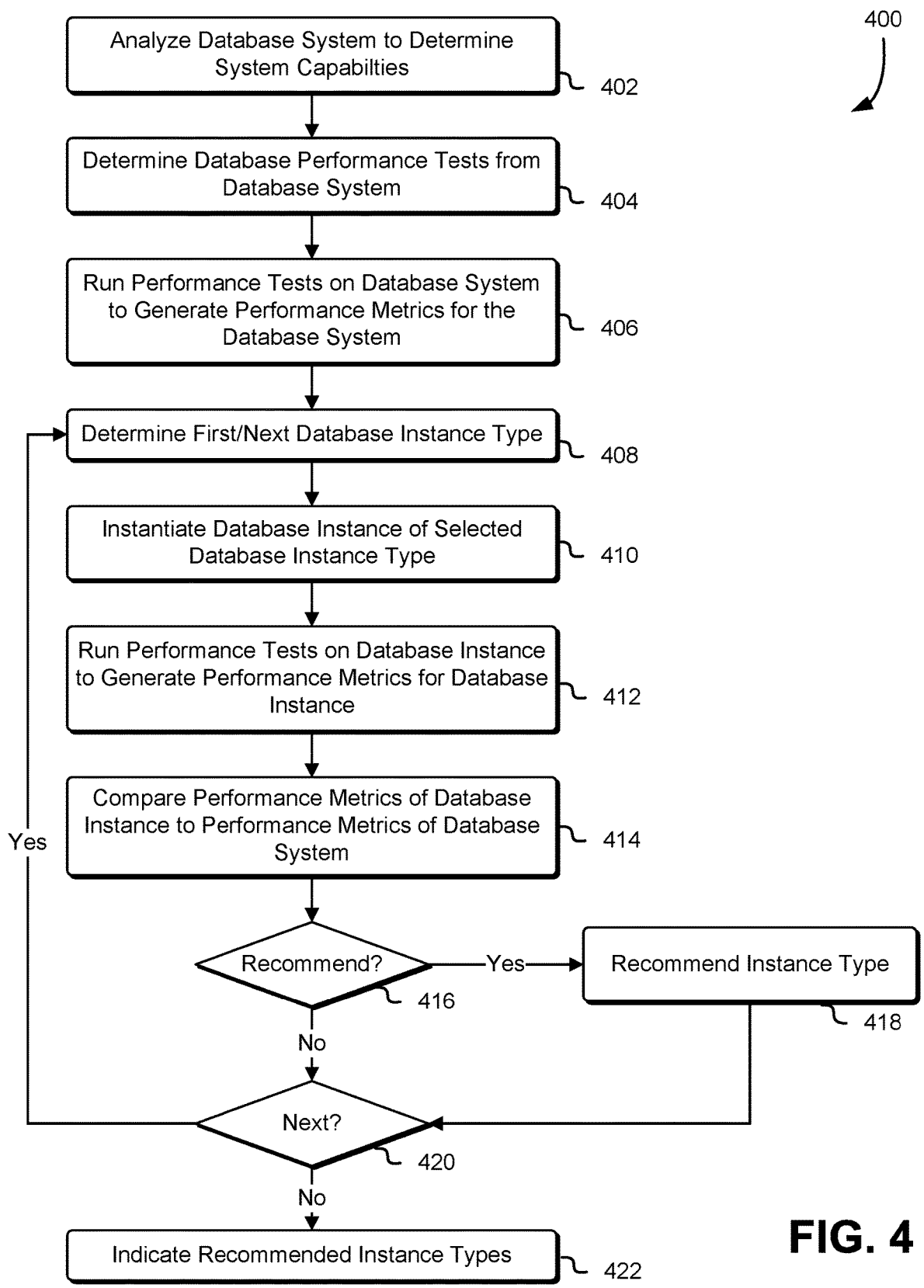
FIG. 4 illustrates an example process for analyzing a database system and providing recommendations for a database instance type using a database analysis service.

FIG. 4 illustrates an example process 400 for analyzing a database system and providing recommendations for a database instance type using a database analysis service as described in connection with FIG. 1 and in accordance with an embodiment. In one embodiment, a database analysis service such as the database analysis service 104 described in connection with FIG. 1 performs the example process 400 illustrated in FIG. 4. In the example process 400 illustrated in FIG. 4, the database analysis service analyzes 402 the database system to determine the system capabilities of the database system. In one embodiment, the database system is a customer database system as described above. In one embodiment, the database analysis service determines 404 the database performance tests to perform based at least in part on the analysis of the customer database system as described above.

In one embodiment, the database analysis service runs 406 the performance tests on the database system to generate the performance metrics for the customer database system (also referred to herein as the "performance test results" or the "database performance test results" for the database system). In one embodiment, the performance metrics for the database system are stored for later comparison with the performance test metrics for the instantiated database instances of the different database instance types. It should be noted that the performance metrics for the database system are the target performance metrics for the instantiated database instances and represent the desired performance for a database instance of the database instance type that is identified as a candidate for migration.

In one embodiment, the database analysis service determines 408 the first instance type from a repository of database instance types as described herein. In one embodiment, the database analysis service instantiates 410 a database instance of the selected database instance type and runs 412 the performance tests on the database instance of the selected database instance type to generate performance metrics for the database instance of the selected database instance type. In one embodiment, the performance tests that are run on the database instance of the selected instance type are identical to the performance tests that are run on the database system. In one embodiment, the performance tests that are run on the database instance of the selected instance type include at least a subset of the performance tests that are run on the database system.

In one embodiment, the database analysis service compares 414 the performance metrics of the database instance of the selected database type to the performance metrics of the database system to determine if the database instance of the selected database instance type has the same or better data throughput, query speed, concurrency, CPU usage, memory usage, network bandwidth, and/or performance for other database performance metrics as compared to the database system. If the database analysis service determines that the database instance of the selected database instance type has the same or better data throughput, query speed, concurrency, CPU usage, memory usage, network bandwidth, and/or performance for other database performance metrics as compared to the database system and that the database analysis service should indicate 416 that the database instance type be recommended, the database analysis service, in one embodiment, recommends 418 the database instance type as an instance type suitable for migration. If the database analysis service does not determine that the database instance of the selected database instance type has the same or better data throughput, query speed, concurrency, CPU usage, memory usage, network bandwidth, and/or performance for other database performance metrics as compared to the database system and that the database analysis service should not indicate 416 that the database instance type be recommended, in one embodiment, the database analysis service determines 420 whether there are more database instance types to analyze. Finally, if the database analysis service does not determine 420 that there are more database instance types to analyze, in one embodiment, the database analysis service will indicate 422 the recommended instance types to the customer.

Figure 5:
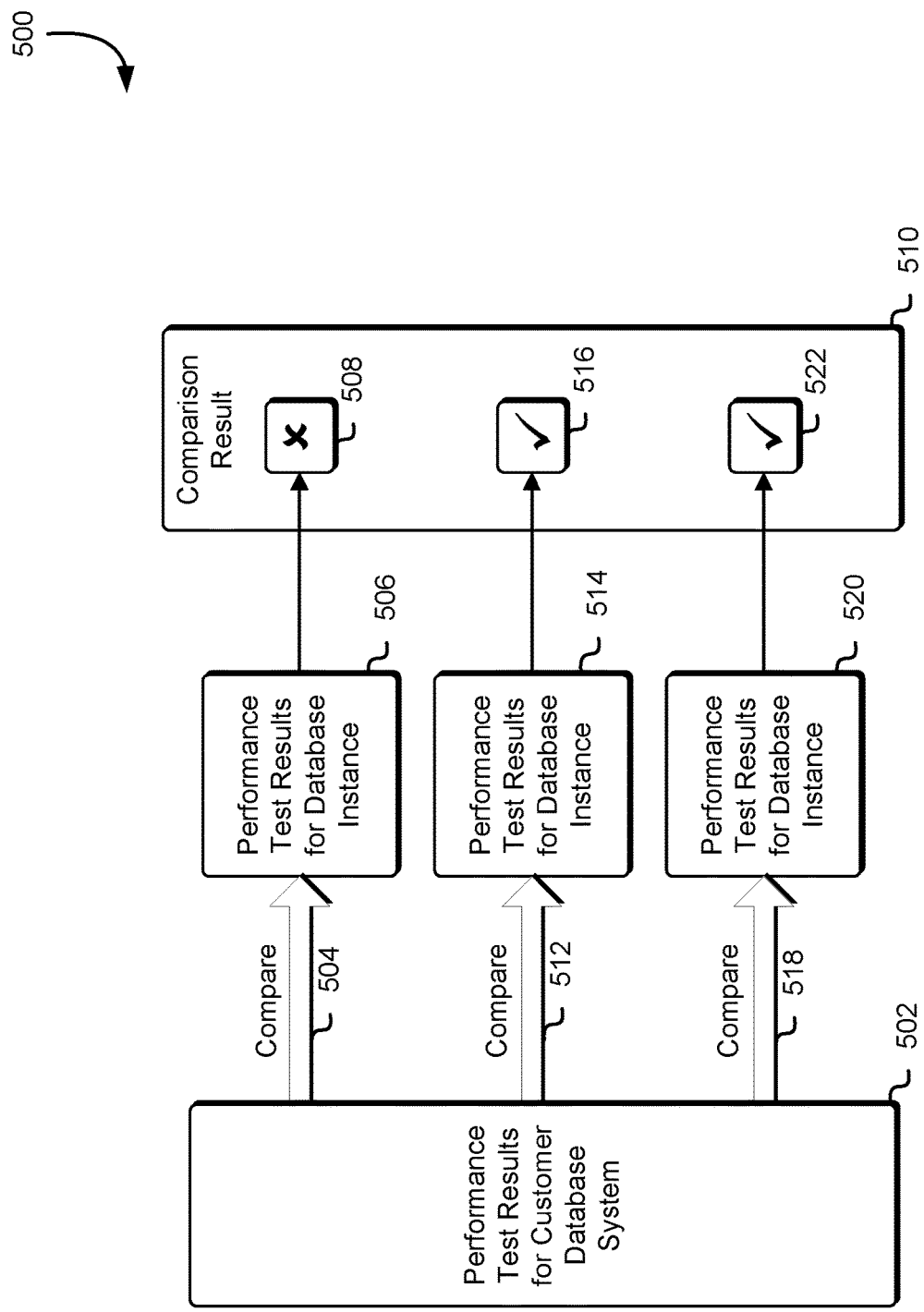
FIG. 5 illustrates an example environment where performance test results for database instances are compared against performance test results for a database system using a database analysis service.

FIG. 5 illustrates an example environment 500 where performance test results for database instances are compared against performance test results for a database system using a database analysis service as described in connection with FIG. 1 and in accordance with an embodiment. In the example environment 500 illustrated in FIG. 5, the performance test results for the customer database system 502 are compared to performance test results from one or more database instances and a comparison result 510 is determined. In the example environment 500 illustrated in FIG. 5, there are three database instances with performance test results. In one embodiment, the performance test results for a first database instance 506 are compared 504 against the performance test results for the customer database system 502 and a comparison result 508 is obtained. In the example environment 500 illustrated in FIG. 5, the comparison result 508 is an indication that the first database instance is not suitable for migration (as indicated by the "X" mark). In one embodiment, first database instance is not suitable for migration because one or more of the performance tests showed that the first database instance did not have the same or better data throughput, query speed, concurrency, CPU usage, memory usage, network bandwidth, and/or performance for other database performance metrics.

In the example environment 500 illustrated in FIG. 5, the performance test results for a second database instance 514 are compared 512 against the performance test results for the customer database system 502 and a comparison result 516 is obtained. In the example environment 500 illustrated in FIG. 5, the comparison result 516 is an indication that the second database instance is suitable for migration (as indicated by the "check" mark). In one embodiment, the second database instance is suitable for migration because the performance tests showed that the second database instance does have the same or better data throughput, query speed, concurrency, CPU usage, memory usage, network bandwidth, and/or performance for other database performance metrics.

In the example environment 500 illustrated in FIG. 5, the performance test results for a third database instance 520 are compared 518 against the performance test results for the customer database system 502 and a comparison result 522 is obtained. In the example environment 500 illustrated in FIG. 5, the comparison result 522 is an indication that the third database instance is suitable for migration (as indicated by the "check" mark). In one embodiment, the third database instance is suitable for migration because the performance tests showed that the third database instance does have the same or better data throughput, query speed, concurrency, CPU usage, memory usage, network bandwidth, and/or performance for other database performance metrics.

It should be noted that, when the comparison of the performance test results for database instances are compared against performance test results for a database system using a database analysis service, and more than one database instance type is suitable for migration as in the example environment 500 illustrated in FIG. 5, the database analysis service may indicate that one or more of the more than one database instance type as being suitable for migration to the customer. In one embodiment, the database analysis service indicates all of the database instance types as suitable for migration to the customer and provides a mechanism for the customer to select the database instance type. In one embodiment, the database analysis service indicates the smallest minimally capable (i.e., the least expensive) database instance type to the customer as a recommendation. The smallest minimally capable database instance type is the database instance type that is suitable for migration that has the lowest cost and/or the lowest cost of ownership. In one embodiment, an initial database instance (e.g., as described herein) is determine based at least in part on a total cost of ownership calculator for the database system (e.g., the customer database system). In one embodiment, the database analysis service indicates all of the database instance types as suitable for migration to the customer and includes information usable by the customer to select one of the instance types including, but not limited to, a cost-benefit analysis associated with migrating to each of the database instance types. In one embodiment, the database analysis service selects the best instance type from the database instance types that are suitable for migration, instantiates a new database instance of that selected instance type, and begins migration of the customer data to the new database instance of the selected instance type.

Figure 6:
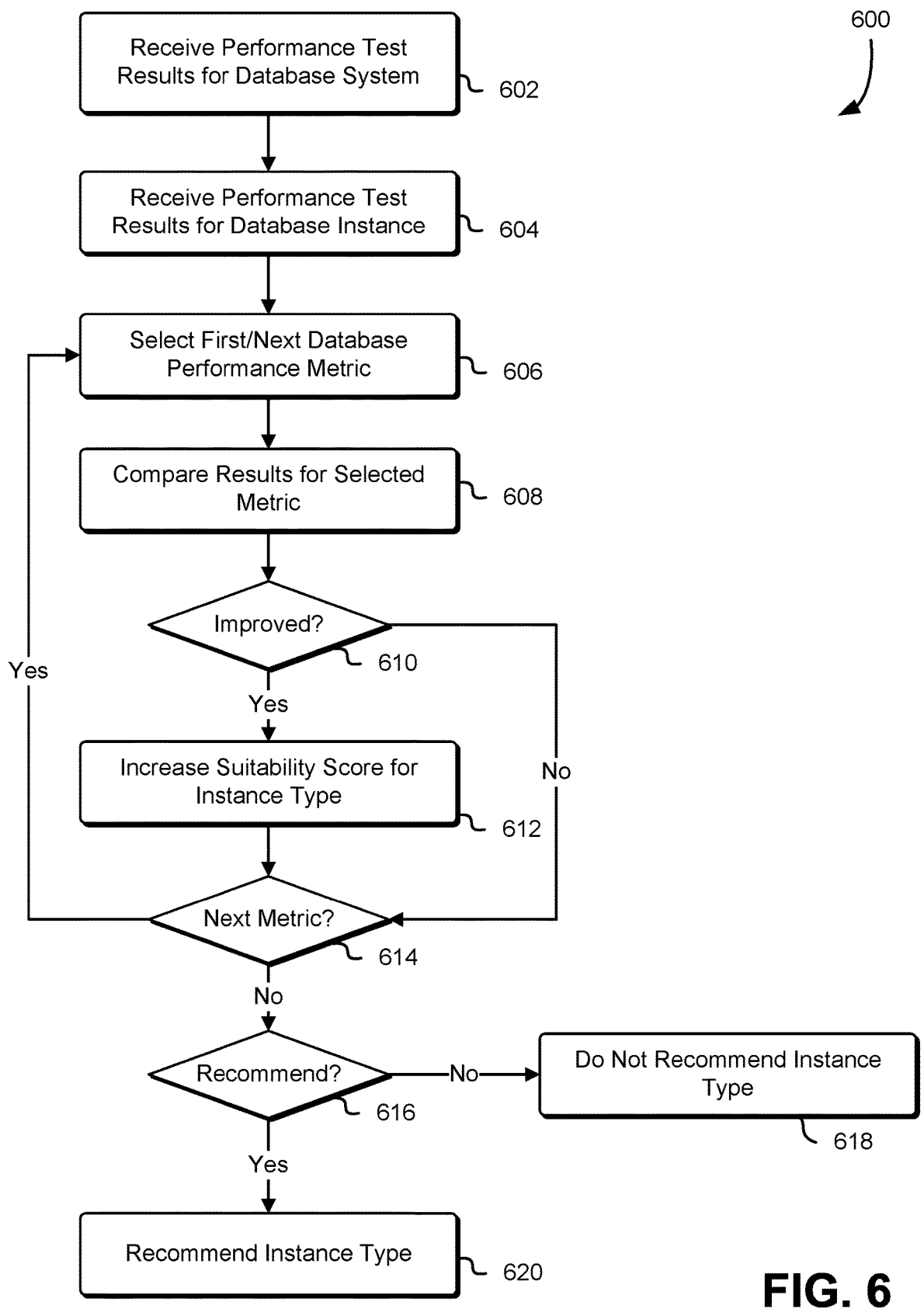
FIG. 6 illustrates an example process for comparing performance test results for database instances to performance test results for a database system using a database analysis service.

FIG. 6 illustrates an example process 600 for comparing performance test results for database instances to performance test results for a database system using a database analysis service as described in connection with FIG. 1 and in accordance with an embodiment. In one embodiment, a database analysis service such as the database analysis service 104 described in connection with FIG. 1 performs the example process 600 illustrated in FIG. 6. In the example process 600 illustrated in FIG. 6, the database analysis service first receives 602 performance test results for a database system as described above and receives 604 the performance test results for a database instance of a database instance type. In one embodiment, the database analysis service selects 606 the first performance metric from the performance test results of the database instance of the database instance type and compares 608 the results for that first performance metric to the results for that first performance metric from the performance tests of the database system (e.g., the customer database system).

In one embodiment, if the database analysis service determines 610 that the database instance for the database instance type improves upon the selected database performance metric, the database analysis service increases 612 a suitability score for the database instance type (i.e., provides an indication that the database instance type is more suitable as a candidate for migration). In one embodiment, if the database analysis service determines 610 that the database instance for the database instance type does not improve upon the selected database performance metric, the database analysis service determines 614 whether to analyze the next metric. In one embodiment, if the database analysis service determines 610 that the database instance for the database instance type does not improve upon the selected database performance metric, the database analysis service may reject the instance type as unsuitable.

In one embodiment, if the database analysis service determines 614 that there are no more metrics to analyze, the database analysis service determines 616 whether to recommend the database instance type for migration based at least in part on the suitability score. In one embodiment, if the database analysis service determines 616 not to recommend the database instance type for migration, the database analysis service may not 618 recommend the instance type. In one embodiment, if the database analysis service determines 616 to recommend the database instance type for migration, the database analysis service may 620 recommend the instance type.

Figure 7:
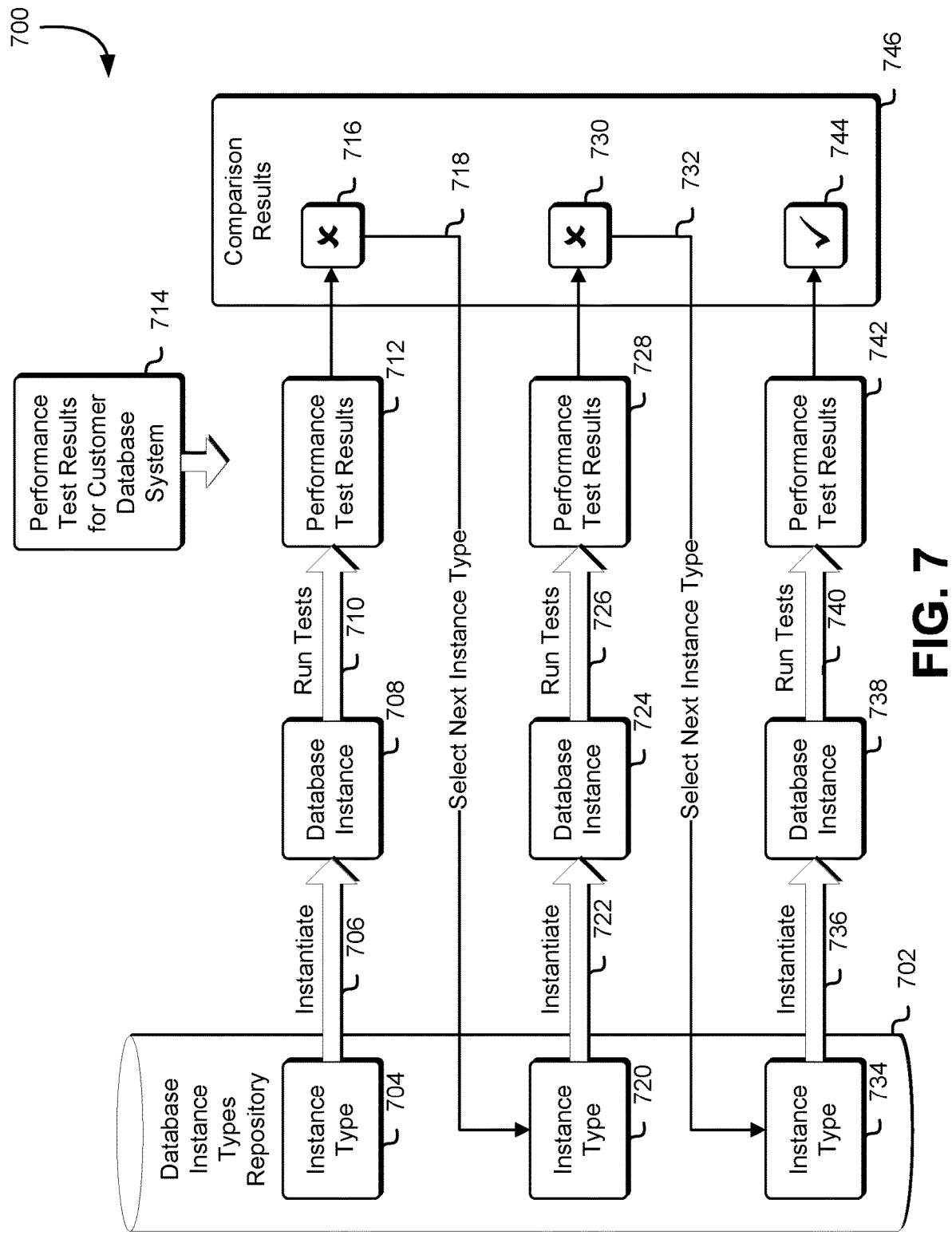
FIG. 7 illustrates an example environment where performance test results for database instances are iteratively compared against performance test results for a database system using a database analysis service.

FIG. 7 illustrates an example environment 700 where performance test results for database instances are iteratively compared against performance test results for a database system using a database analysis service as described in connection with FIG. 1 and in accordance with an embodiment. In the example environment 700 illustrated in FIG. 7, a first database instance type 704 from a database instance types repository 702 is instantiated 706 to create a corresponding database instance 708. In one embodiment, the database analysis service runs database performance tests 710 to generate database performance test results 712 as described above. These database performance test results 712 are compared to the performance test results for the customer database system 714 to obtain a comparison result 716 of the comparison results 746. The comparison result 716 that is obtained indicates that the first database instance type is not suitable for migration (as indicated by the "X" mark).

In the example environment 700 illustrated in FIG. 7, because the comparison result 716 that is obtained indicates that the first database instance is not suitable for migration, the database analysis service selects the next instance type 718 from the database instance types repository 702. In one embodiment, a second database instance type 720 from the database instance types repository 702 is instantiated 722 to create a corresponding database instance 724. In one embodiment, the database analysis service runs database performance tests 726 to generate database performance test results 728 as described above. These database performance test results 728 are compared to the performance test results for the customer database system 714 to obtain a comparison result 730. The comparison result 730 that is obtained indicates that the second database instance type is also not suitable for migration (as indicated by the "X" mark).

In the example environment 700 illustrated in FIG. 7, because the comparison result 730 that is obtained indicates that the second database instance is not suitable for migration, the database analysis service selects the next instance type 732 from the database instance types repository 702. In one embodiment, a third database instance type 734 from the database instance types repository 702 is instantiated 736 to create a corresponding database instance 738. In one embodiment, the database analysis service then runs database performance tests 740 to generate database performance test results 742 as described above. These database performance test results 742 are compared to the performance test results for the customer database system 714 to obtain a comparison result 744. The comparison result 744 that is obtained indicates that the third database instance type is suitable for migration (as indicated by the "check" mark).

In one embodiment, the database analysis service stops selecting the next instance type from the database instance types repository 702 when a database instance type that is suitable for migration is identified. In one embodiment, the database analysis service will continue selecting the next instance type from the database instance types repository 702 until all instance types that are suitable for migration are identified.

Figure 8:
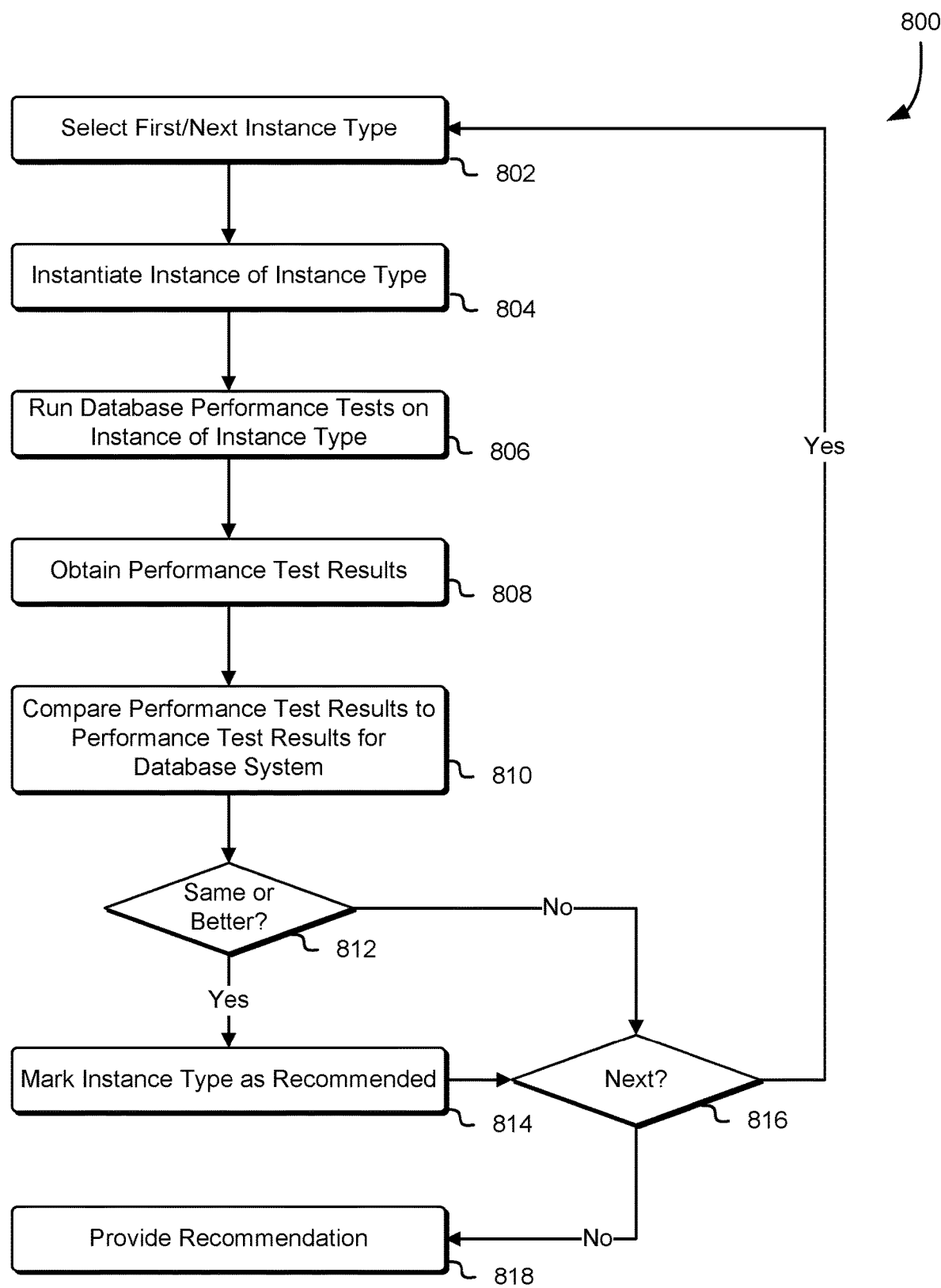
FIG. 8 illustrates an example process for iteratively comparing test results for database instances against performance test results for a database system using a database analysis service.

FIG. 8 illustrates an example process 800 for iteratively comparing test results for database instances against performance test results for a database system using a database analysis service as described in connection with FIG. 1 and in accordance with an embodiment. In one embodiment, a database analysis service such as the database analysis service 104 described in connection with FIG. 1 performs the example process 800 illustrated in FIG. 8. In the example process 800 illustrated in FIG. 8, the database analysis service first selects 802 the first database instance type to analyze and instantiates 804 a database instance of the selected instance type. In one embodiment, the database analysis service runs 806 the database performance tests on the database instance to obtain 808 performance test results for the database instance of the selected instance type as described herein.

In one embodiment, the database analysis service compares 810 the performance test results for the database instance of the selected database instance type to the performance test results for a database system (e.g., the customer database system) to determine 812 whether the database instance provides the same or better data throughput, query speed, concurrency, CPU usage, memory usage, network bandwidth, and/or performance for other database performance metrics as compared to the database system. In one embodiment, if the database analysis service does determine 812 that the database instance provides the same or better data throughput, query speed, concurrency, CPU usage, memory usage, network bandwidth, and/or performance for other database performance metrics, the database analysis service may mark 814 the database instance type as recommended. In one embodiment, the database analysis service determines 816 whether there are more instance types to analyze and if there are not more instance types to analyze, provides 818 the recommendation (e.g., a list of the recommended database instance types) to the customer.

Figure 9:
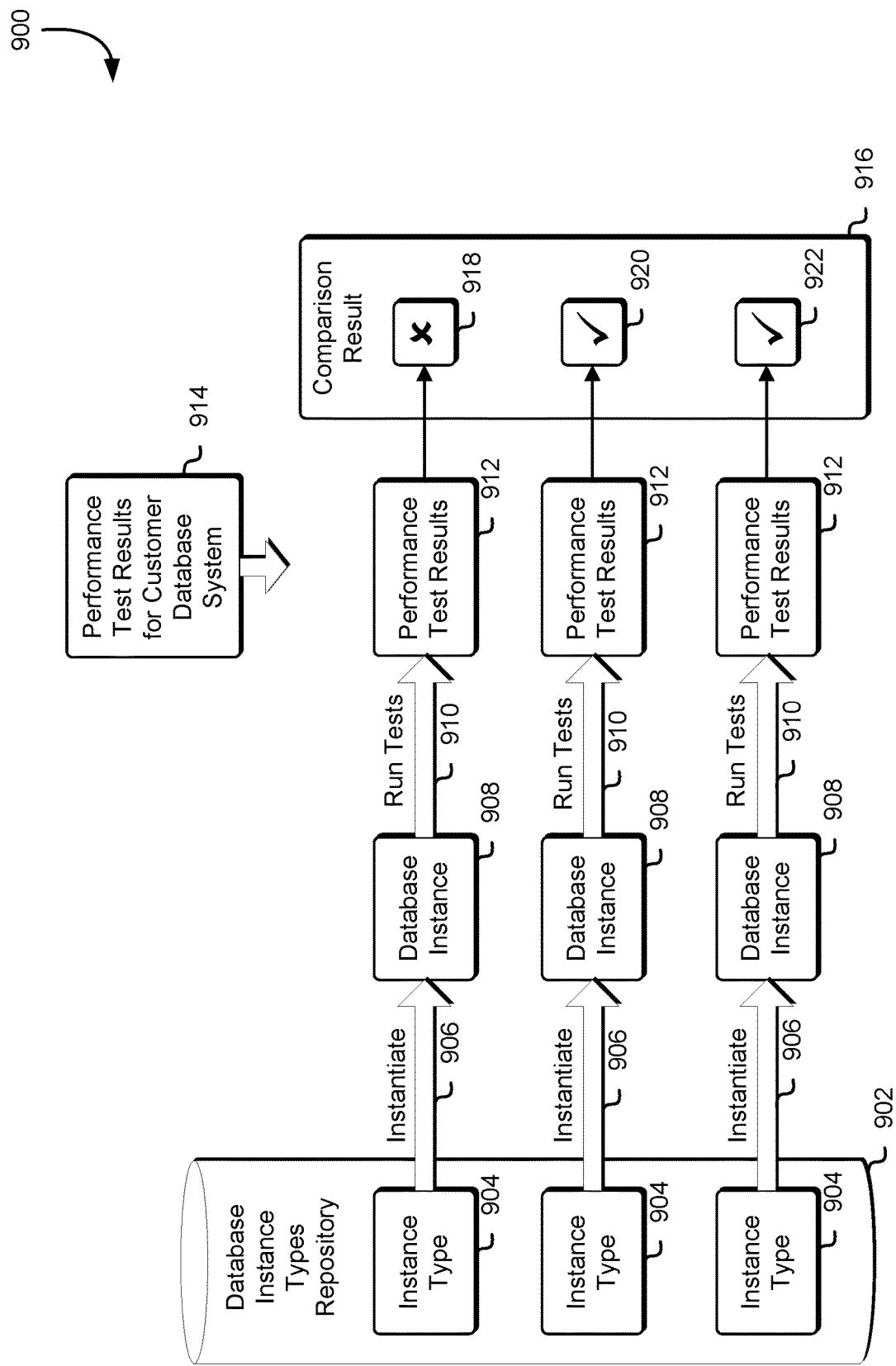
FIG. 9 illustrates an example environment where performance test results for database instances are compared against performance test results for a database system in parallel using a database analysis service.

FIG. 9 illustrates an example environment 900 where performance test results for database instances are compared against performance test results for a database system in parallel using a database analysis service as described in connection with FIG. 1 and in accordance with an embodiment. In the example environment 900 illustrated in FIG. 9, each of the instance types 904 selected from a database instance types repository 902 is instantiated 906 to create a corresponding database instance 908. In one embodiment, the database analysis service runs the database performance tests 910 on each of the database instances 908 to obtain the performance test results 912 for each database instance. In one embodiment, the database analysis service compares the performance test results 912 for each of the database instances to the performance test results for the customer database system 914 to obtain the comparison results 916 as described above.

In the example environment 900 illustrated in FIG. 9, the performance test results for a first database instance are compared against the performance test results for the customer database system 914 and a comparison result 918 is obtained that indicates that the first database instance is not suitable for migration (as indicated by the "X" mark), the performance test results for a second database instance are compared against the performance test results for the customer database system 914 and a comparison result 920 is obtained that indicates that the first database instance is suitable for migration (as indicated by the "check" mark), and performance test results for a third database instance are compared against the performance test results for the customer database system 914 and a comparison result 922 is obtained that indicates that the first database instance is suitable for migration (as indicated by the "check" mark).

Figure 10:
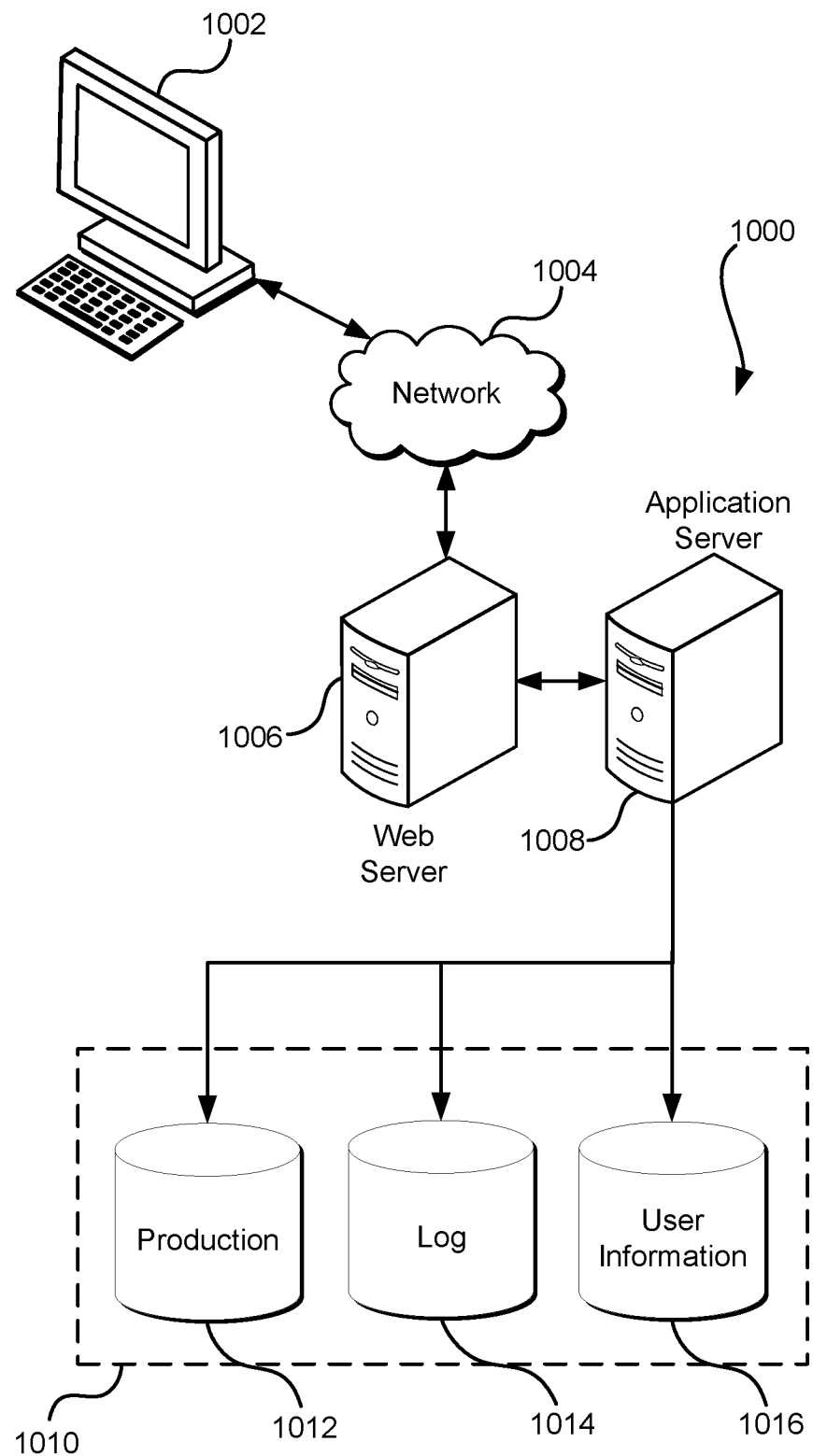
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. In one embodiment, the environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A computer-implemented method, comprising:
   generating a first set of metrics corresponding to a database system based at least in part on the database system;
   identifying one or more database instance types based at least in part on the database system;
   instantiating one or more database instances, a database instance of the one or more database instances corre- sponding to a database instance type of the one or more database instance types and implementing the database system;

generating a second set of metrics corresponding to metrics obtained during operation of the database instance by at least performing a set of tests on the database instance;

comparing the second set of metrics to the first set of metrics to generate one or more recommended database instance types based at least in part on a determination that the database instance increases an aspect of database performance relative to the database system; and providing an indication to an account associated with the database system of one or more recommended database instance types.

2. The computer-implemented method of claim 1, wherein:

the first set of metrics is generated by performing a set of database performance tests on the database system; and wherein the set of tests further comprises at least one database performance test of the set of database performance tests.

3. The computer-implemented method of claim 2, wherein the first set of metrics is generated by performing the set of database performance tests on the database system using login credentials associated with the account.

4. The computer-implemented method of claim 1, wherein the aspect of database performance includes at least one of: database data throughput, database query speed, database concurrency, central processing unit usage, memory usage, or network bandwidth.

5. A system, comprising:

non-transitory memory to store computer-executable instructions which, if performed by one or more processors, cause the system to at least:

generate a first set of metrics corresponding to a database system;

instantiate a plurality of database instances to implement the database system, a first database instance of the plurality of database instances having a corresponding database instance type of a plurality of database instance types;

generate a plurality of second sets of metrics, a second set of metrics of the plurality of the second sets of metrics obtained during execution of the first database instance of the one or more database instances and a third set of metrics of the plurality of second sets of metrics obtained during execution of a second database instance; and indicate, on an account, one or more recommended database instance types based at least in part on comparing the second set of metrics, the first set of metrics, and the third set of metrics to determine an increase to an aspect of database performance relative to the database system.

6. The system of claim 5, wherein the plurality of database instance types are identified from a set of database instance types based at least in part on the database system.

7. The system of claim 5, wherein the instructions which cause the system to instantiate the database instances, cause the system to instantiate the plurality of database instances in parallel.

8. The system of claim 5, wherein the instructions which cause the system to instantiate the plurality of database instances, cause the system to at least:

instantiate the first database instance of a first database instance type; and instantiate the second database instance of a second database instance type as a result of the first database instance not increasing the aspect of database performance relative to the database system.

9. The system of claim 8, wherein the second database instance type is an incremental improvement on the first database instance type.

10. The system of claim 8, wherein the first database instance type is selected from the plurality of database instance types based at least in part on an initial configuration, the initial configuration determined from one or more properties of the database system, the one or more properties of the database system including at least one of: a central processing unit speed of the database system, a central processing unit type of the database system, a number of central processing units of the database system, an amount of memory of the database system, a type of memory of the database system, a network bandwidth of the database system, a peak load of the database system, one or more peak load times of the database system, input-output speed of the database system, or concurrency of the database system.

11. The system of claim 8, wherein the first database instance type is selected from the plurality of database instance types using a machine learning algorithm based at least in part on one or more previous database migration requests.

12. The system of claim 5, wherein the database system is a customer database system.

13. A non-transitory computer-readable storage medium having stored thereon executable instructions that, as a result of being executed by one or more processors of a computer system, cause the computer system to at least:

generate a first set of metrics corresponding to a database system;

generate a plurality of second sets of metrics, a second set of metrics of the plurality of second sets of metrics indicating one or more attributes of a first database instance of a plurality of database instances during operation of the first database instance, the first database instance of the plurality of database instances instantiated based at least in part on a corresponding database instance type and performing tests executed by the database system in generating the first set of metrics and a third set of metrics of the plurality of second sets of metrics indicating the one or more attributes of a second database instance of the plurality of database instances during operation of the second database instance; and indicate, to an account, one or more recommended database instance types based at least in part on comparing the second set of metrics, the first set of metrics, and the third set of metrics to determine whether the first database instance increases an aspect of database performance relative to the database system.

14. The non-transitory computer-readable storage medium of claim 13, wherein the instructions further comprise instructions that, as a result of being executed by the one or more processors, cause the computer system to select a recommended database instance type of the one or more recommended database instance types based at least in part on one or more previous database migration requests.

15. The non-transitory computer-readable storage medium of claim 13, wherein the instructions further comprise instructions that, as a result of being executed by the one or more processors, cause the computer system to:

select a first recommended database instance type of the one or more recommended database instance types;

instantiate one or more first database instances of the first recommended database instance type; and migrate the database system to the one or more first database instances.

16. The non-transitory computer-readable storage medium of claim 13, wherein the instructions that cause the computer system to indicate one or more recommended database instance types further include instructions that cause the computer system to:

provide the one or more recommended database instance types to a computing device of a customer associated with the account; and receive, from the computing device of the customer, a selected recommended database instance type of the one or more recommended database instance types.

17. The non-transitory computer-readable storage medium of claim 13, wherein:

the first set of metrics is generated by performing a first set of database performance tests on the database system; and the second set of metrics is generated by performing a second set of database performance tests on the first database instance.

18. The non-transitory computer-readable storage medium of claim 17, wherein the first set of performance tests is identical to the second set of performance tests.

19. The non-transitory computer-readable storage medium of claim 13, wherein the instructions that cause the computer system to indicate the one or more recommended database instance types further include instructions that cause the computer system to indicate a smallest minimally capable database instance type as a recommended database instance type.

20. The non-transitory computer-readable storage medium of claim 13, wherein the instructions that cause the computer system to indicate the one or more recommended database instance types further include instructions that cause the computer system to indicate all database instance types where the corresponding database instance increases an aspect of database performance relative to the database system.

* * * * *